US006486959B2

(12) United States Patent
Delaye et al.

(10) Patent No.: US 6,486,959 B2
(45) Date of Patent: Nov. 26, 2002

(54) DYNAMIC HOLOGRAPHIC VELOCIMETER FOR THE MEASUREMENT OF VIBRATIONS

(75) Inventors: Philippe Delaye, Paris; Gérald Roosen, La Celle les Bordes, both of (FR)

(73) Assignee: Centre National de la Recherche Scientifique - CNRS (FR)

( * ) Notice: Subject to any disclaimer, the term of this patent is extended or adjusted under 35 U.S.C. 154(b) by 0 days.

(21) Appl. No.: 09/754,615

(22) Filed: Jan. 4, 2001

(65) Prior Publication Data

US 2002/0105651 A1 Aug. 8, 2002

Related U.S. Application Data

(63) Continuation of application No. PCT/FR99/01631, filed on Jul. 6, 1999.

(30) Foreign Application Priority Data

Jul. 6, 1998 (FR) .............................................. 98 08630

(51) Int. Cl.[7] ................................................ G01B 9/02
(52) U.S. Cl. ..................................... 356/457; 356/28.5
(58) Field of Search ............................... 356/457, 28.5, 356/458; 359/15

(56) References Cited

U.S. PATENT DOCUMENTS 3,899,921 A    8/1975   Hockley

OTHER PUBLICATIONS

Ing R K et al. "Broadband Optical detection of ultrasound by two–wave mixing in a photorefractive crystal", Applied Physics Letters, Dec. 16, 1991, vol. 59, pp 3233–3235.

Boutin A et al. "Detection of ultrasonic motion of a scattering surface by two–wave mixing in a photorefractive gaas crystal" Applied Physics Letters, Aug. 22, 1994, vol. 65, p 933.

Georges M P et al. "Real–time stroboscopic holographic interferometry using sillenite crystals for the quantitative analysis of vibrations", Optics Communications, Jan. 1, 1998, vol. 145, pp 249–257.

Sun Yusheng et al. "Improvements in a laser heterodyne vibrometer" Review of Scientific Instruments, May 1, 1992, vol. 63, pp 2974–2976.

Nakano H. et al. "Optical Detection of Ultrasound on rough surfaces by a phase–conjugate method", Ultrasonics, Jul. 1, 1995, vol. 33, pp 261–264.

*Primary Examiner*—Frank G. Font
*Assistant Examiner*—Andrew H. Lee
(74) *Attorney, Agent, or Firm*—Schnader Harrison Segal & Lewis LLP

(57) ABSTRACT

A process for velocimetric measurement of a target including causing interference in a dynamic holographic material of a reference laser beam and a beam diffused by the target, and measuring variations in luminous intensity transmitted by the material with a photoelectric detector, wherein the target vibrates with a displacement greater than the wavelength and with an extension limited around a mean position.

24 Claims, 6 Drawing Sheets

DYNAMIC HOLOGRAPHIC VELOCIMETER FOR THE MEASUREMENT OF VIBRATIONS

RELATED APPLICATION

This is a continuation of International Application No. PCT/FR99/01631, with an international filing date of Jul. 6, 1999, which is based on French Patent Application No. 98/08630, filed Jul. 6, 1998.

FIELD OF THE INVENTION

This invention pertains to the field of metrology and, more precisely, to the measurement of the displacement velocity of objects animated by a vibratory movement.

BACKGROUND

For the measurement of the rapid movements of an object, it is known to use equipment employing a laser beam divided into a direct fixed beam and an indirect secondary beam illuminating the vibrating target and interfering in a holographic material.

As an example, U.S. Pat. 3,899,921 describes a system that uses a stationary hologram and is based on the principle of holography in averaged time. In order to augment the amplitude of the measurable vibrations (limited in principle by the averaged time technique), the invention described in this patent of the prior art concerns a device using an auxiliary system that enables compensation of a more or less large part of the displacement of the target. The reference system provides a cartography of the displacement of the object but does not make it possible to follow the temporal variation of this vibration. The reference system is not functional on, for example, objects that are displaced in a transitory manner.

The articles by R. K. Ing and J. P. Monchalin "Broadband optical detection of ultrasound by two-wave mixing in a photorefractive crystal", Appl. Phys. Lett. 59 (1991) 3233 and A. Blouin and J. P. Monchalin "Detection of ultrasonic motion of a scattering surface by two-wave mixing in a photorefractive GaAs crystal", Appl. Phys. Lett. 65 (1994) 932 disclose the use of a two-wave mixing system for the detection of ultrasonic vibrations.

The system described in this document of the prior art operates by measuring the displacement whereas our system measures the instantaneous velocity of the vibrating target. Furthermore, the system that is presented in the article does not measure displacements exceeding the wavelength (circa 0.5 $\mu$m), whereas the invention is designed for the analysis of large displacements (greater than several $\mu$m).

Another article, A. A. Kamshilin, E. V. Mokrushina "Possible use of photorefractive crystals in holographic vibrometry", Sov. Tech. Phys. Lett. 12 (1986) 149 describes the use of a photorefractive crystal in a two-wave mixing system for detection of large-amplitude, high-frequency vibrations. The principle is in fact very close to that of averaged time holography. In this case, when the hologram moves approximately $\pi$, the hologram is obliterated and diffraction is not produced. Thus, a cartography of the lines results in which the phase shift is $\pi$.

The article by S. Breugnot, M. Defour, J.-P. Huignard "Photorefractive two-wave mixing: complex amplitudes solutions in the case of a weak signal beam" Optics Commun. 134 (1997) 599 describes a process for detection of vibrations by means of a hetrodyne or homodyne detection system based on two-wave mixing. One of the base hypotheses is that the vibrations are rapid in relation to the response time and the hologram formed can be obliterated by a vibration of excessively large amplitude. In the case of velocity measurement by Doppler shift (heterodyne detection), the authors consider a continuous grid displacement in the same direction and not of extension limited around a mean position as in the case of the measurement of the vibrational velocity of an object as in the case of the invention.

Furthermore, the article by T. J. Hall, M. A. Fiddy, M. S. Ner "Detector for an optical fiber acoustic sensor using dynamic interferometry" Opt. Lett. 5 (1980) 485 discloses the use of a holographic device for the measurement of acoustic vibrations. The described device only functions at high frequencies with small-amplitude vibrations to avoid obliteration of the grid.

This equipment according to the state of the art is suitable for small-amplitude, high-frequency vibratory displacements. In contrast, the equipment according to the state of the art is not suitable for measuring the velocity of targets vibrating at low frequencies with possibly large amplitude movements.

Thus, it would be advantageous to provide for the measurement of the velocity of objects animated by a vibratory displacement around a mean position without contact and without prior preparation, and to thereby make it possible to establish, among other things, a spectrum of the vibration velocities of this object. It would also be advantageous to provide a device enabling measurement of vibrations with amplitudes on the order of and greater than the wavelength of the light employed, with the study frequencies belonging to the low-frequency domains (typically about 0 to about 10 kHz).

Another advantage would be to enable a measurement that is not sensitive to the surface state of the object and can, therefore, be implemented without prior surface treatment of the object (polishing).

SUMMARY OF THE INVENTION

The invention relates to a process for velocimetric measurement of a target including causing interference in a dynamic holographic material of a reference laser beam and a beam diffused by the target, and measuring variations in luminous intensity transmitted by the material with a photoelectric detector, wherein the target vibrates with a displacement greater than the wavelength and with an extension limited around a mean position.

The invention also relates to a velocimeter including a laser which produces a beam, a beam separator which divides the beam into a reference beam and a target beam, a target vibrating at a frequency lower than about 10 kHz with an amplitude greater than about 0.1 $\mu$m around a mean position, a dynamic holographic material into which the reference and target beams are directed, and a photodetector which detects a luminous signal produced by the dynamic holographic material.

BRIEF DESCRIPTION OF THE DRAWINGS

The invention will be described below in detail in relation to a nonlimitative example of implementation in which.

DETAILED DESCRIPTION

Figure 1:
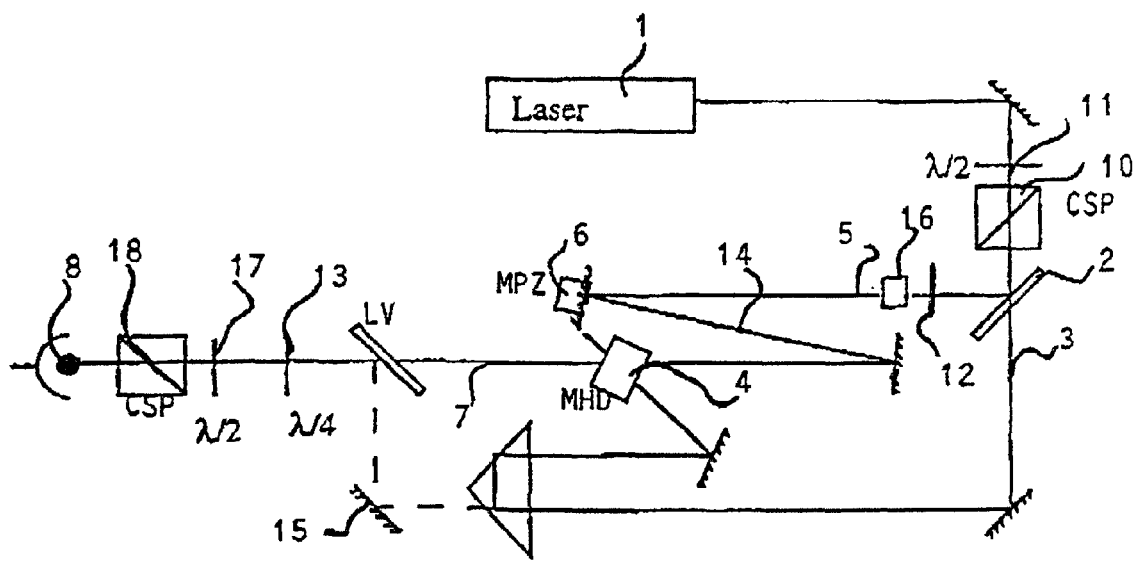
FIG. 1 is a diagram of the experimental setup employed for validating the operation of the two-wave mixing velocimeter.

The following description is intended to refer to specific embodiments of the invention illustrated in the drawings and is not intended to define or limit the invention, other than in the appended claims. Also, the drawings are not to scale and various dimensions and proportions are contemplated.

The invention pertains to a process comprising the mixing of two waves in a dynamic holographic material that is already used for developing an ultrasonic vibration pickup. The measurement point on the object is illuminated by a beam emitted by a laser source. The wave that is reflected and diffused by the measurement point is transmitted into the dynamic holographic material at the same time as a pump wave emitted by the same laser source. These waves form in the dynamic holographic material a hologram of the structure of the wave front of the signal wave emitted by the object. This hologram is read again by the pump beam to provide a local oscillator beam which is transmitted to a detector at the same time as the signal beam transmitted by the dynamic holographic material. The two waves (local oscillator and transmitted signal wave) are identical and phase shifted by a value which is dependent on the setup and the material employed because of the properties of holography. This phase shifting is selected to optimize operation of the invention.

When the object enters into vibration (naturally or subsequent to an external excitation), the vibration of the measurement point modulates in phase the signal wave transmitted by the object. The goal of the system is to transform this phase modulation into intensity modulation which is transformed into an electric signal characteristic of the vibration. This transformation is dependent both on the frequency of the vibration and on its amplitude. For vibrations of very small amplitude (in relation to the wavelength of the light employed) and of very high frequency (in relation to the inverse of the response time of the dynamic holographic material), solutions are known in the prior art.

This is the case, for example, of the ultrasonic vibrations in which the phase modulation is too rapid and of too small amplitude to disturb the hologram formed in the dynamic holographic material. This material is thus stationary from the point of view of the vibration and the local oscillator emitted by the diffraction of the stationary pump beam on the stationary hologram is itself stationary. It is transmitted onto the detector at the same time as the transmitted signal beam which is phase modulated by the ultrasonic vibration. If the phase shift $\phi_\gamma$ between the two beams transmitted to the detector is taken to be equal to $\pi/2$ (waves in quadrature), the interference between the signal beam and local oscillator transforms the phase modulation into intensity modulation, then into electric signal directly proportional to the amplitude of the ultrasonic vibration. The two-wave mixing setup is thus very suitable for the measurement of the ultrasonic vibrations.

In contrast, when it is desired to increase the amplitude of the vibrations that can be measured (while remaining at high frequency), the devices according to the state of the art are no longer applicable. In fact, when the vibration has a large amplitude (in relation to the wavelength of the light), the response of the device is no longer linear and then the hologram is obliterated by the phase modulation, which causes disappearance of the local oscillator and suppresses the electric measurement signal. It is, therefore, not possible to use such a device for the measurement of vibrations of large amplitude and high frequency.

The problem is resolved by the invention in the case of vibrations of low frequency (in relation to the inverse of the response time of the dynamic holographic material) and it is then possible to measure vibrations of large amplitude. At low frequency, the hologram formed is no longer stationary. It is displaced according to a law linked to the phase modulation. However, it follows this modulation with a certain delay which is dependent on the frequency of variation of this phase modulation (the slower it is, the better it follows it). The phase modulation delayed by the displacement of the hologram is then transmitted to the local oscillator which will again interfere in quadrature with the transmitted signal wave. The electric signal is then proportional to the derivative of the phase modulation and thus proportional to the instantaneous velocity of the vibrating object. The saturation at large amplitude of displacement still exists, but it is considerably relaxed and can be controlled by the response time of the dynamic holographic material. At a given frequency, the value corresponding to the saturation will be as large as the response time of the holographic material is short.

The invention is an original adaptation of the two-wave mixing system in a dynamic holographic material enabling extension of the operating domain to the measurement of vibrations of low-frequency (compared to the response time of the dynamic holographic material) and large amplitude (compared to the wavelength of the light employed). All of the devices that have been employed have always considered the hologram to be fixed at the time scale of the vibration. None of the devices have used a mobile hologram for the detection of the vibration (with the exception of the very different device using the transitory photoelectromotive force for the measurement of the Doppler shift).

The invention also presents the advantage that it makes it possible to follow transitory signals in their development over time.

Vibration pickups are currently available commercially. They are based on (homodyne or heterodyne) coherent detection. Although these pickups exhibit a high level of performance, their efficacy drops when they are employed with diffusing surfaces, since it is often impossible to perform the measurement without polishing the surface of the test object. However, there are a certain number of fields in which it is not possible to polish the test object.

Turning now to the drawings, FIG. 1 shows a diagram of an example of implementation of a two-wave mixing velocimeter according to the invention. Different architectures are possible for obtaining a beam diffracted in quadrature with the transmitted beam ($\phi_y=\pi/2$) and on the types of materials that can be used. The light emitted by a laser (1) is separated into two beams by a beam separator (2). One of the two beams, the reference beam (3), is transmitted into the dynamic holographic material (4) to form the pump beam. The other beam, the measurement beam (5), is transmitted onto the target (6), the vibration of which is to be measured. The light transmitted back by the target (6) is collected and transmitted onto the dynamic holographic material (4) to form the signal beam (14).

The transport of beams (for the signal as well as for the pump beams) can be performed with large core diameter multimodal fibers to have an offset measurement. The light of the signal beam (7), after traversing the holographic material (4), is transmitted onto a detector (8) to give an electric signal which will then be processed by an electronic system. This base device is supplemented by optical means that provide a diffracted beam (7) in quadrature with the transmitted signal (7). Various possibilities exist for obtaining $\phi_y=\pi/2$. They are established principally on the basis of the nature of the dynamic holographic material (4).

The first possibility is the use of a dynamic holographic material (4) in which the hologram formed is local, i.e., in phase with the illumination figure, such as, for example, a photorefractive material with an applied electric voltage. In this case, we have $\phi_y \approx \pi/2$ directly. It is sufficient to employ the detector (8).

A second possibility is the use of a material in which the hologram is phase shifted by $\pi/2$ in relation to the illumination grid, as in the case of a photorefractive material without application of an electric field. In this case, $\phi_y=0$ is obtained automatically. This indicates a null efficacy of the device. It is, therefore, necessary to add a supplementary phase shift in an external manner to obtain $\phi_y=\pi/2$. Many possibilities exist.

A first solution consists of polarizing the incidental beams (3, 5 or 14), with the pump beam following a direction X and the signal beam (14) at 45° to this direction.

The signal beam (14) comprises two components of equal amplitudes according to the two directions of polarization X and Y, with Y designating the direction orthogonal to X. The component polarized according to X of the signal beam (14) forms the hologram with the pump beam (3) and thereby creates a diffracted beam polarized according to X.

The transmitted beam (7), in turn, comprises the two components according to X and Y. After the dynamic holographic material, preferably crystal (4), a phase plate (13) is placed, the axes of which are according to the directions X and Y and which phase shifts by $\pi/2$ the component according to Y of the signal beam (7) transmitted in relation to the diffracted beam (7) which is polarized according to X. The two components are then made to interfere by placing a polarization separator cube (18) oriented at 45° to the directions X and Y and the two beams emitted by the cube are sent onto two detectors (8). On the two detectors (8), there are two signals corresponding to the two phase shiftings equal to $+\pi/2$ and $-\pi/2$, respectively. The difference between the two electric signals is then transmitted to provide the final measurement signal.

With this type of hologram, it is also possible to use the photorefractive crystal in a particular configuration called anisotropic diffraction configuration in which the diffracted beam is polarized orthogonally in relation to the writing beam. Thus, it is possible to use in the preceding setup, two incidental beams polarized according to X, with the diffracted beam polarized according to Y. By adding an optical system identical to the preceding system (phase plate oriented according to X and Y and phase shifting of $\pi/2$, then a polarization separator cube oriented at 45° transmitting the beams onto two detectors (8)), a differential signal is again obtained.

These two setups can be generalized to holographic material (4) in which the hologram has any phase shifting in relation to the illumination grid (the case of a photorefractive crystal under an electric field). In such a case, the setup is identical to the preceding setups, but the phase plate has a variable phase shifting which serves simply to bring the total phase shifting $\phi_y$ between the diffracted beam and the transmitted signal to its optimal value of $\pi/2$.

The material to be employed can be in a general manner any dynamic holographic material (4), i.e., a material in which an illumination structure given by the interference of two beams generates a hologram of one of these beams, with this hologram being dynamic, i.e., that it follows the evolutions of the illumination structure in a manner that is sufficiently rapid to respond to the imposed requirements. Among these dynamic materials, photorefractive materials can be employed advantageously. Among the photorefractive crystals, it is possible to use the sillenites, as well as the semiconductive Ill-V compounds such as GaAs, InP and II-VI compounds such as CdTe, ZnTe or quantum well structures. This setup, like devices based on holographic techniques, enables parallel measurements on multiple points in the context of multichannel processing or imaging.

The process according to the invention is based on the use of a dynamic holographic material (4) in which a hologram is formed. This can be a phase or amplitude hologram. The continuation of the explanation will be presented taking into consideration a phase hologram or index grid. It can be easily adapted to take into consideration the case of an amplitude hologram or absorption grid. This hologram is obtained by performing interference on the dynamic holographic material (4) with the signal beam (14) (of amplitude $E_s$ and intensity $I_s$) emitted by the target (6) with a pump beam (3) (of amplitude $E_p$ and intensity $I_p$) emitted by the same laser.

In a stationary domain, the hologram is an index variation the amplitude $\Delta$ which is proportional to m, term of interference between the two beams (given by the product $2E_s E_p^*/(I_s+I_p)$). The hologram is dynamic, which means that it reaches its stationary domain after a certain period of time. This dynamic will be given (without loss of generality) by a first order law of kinetics with a real time constant. Since the hologram is characterized by the quantity $\Delta n$, this quantity thus follows the law of variation of formula (1) (G is the constant of proportionality giving the force of the index grid):

$$\frac{\partial \Delta n}{\partial t} + \frac{\Delta n}{\tau} = \frac{G}{\tau} \frac{m}{2} \quad (1)$$

If the target (6) vibrates, this will be translated by the introduction of a transitory phase modulation $\phi(t)$ (proportional to the displacement $\delta(t)$ of the target (6)) on the signal beam (14) and, subsequently, by a displacement of the interference figure according to: $E_s(t)=E_{s0}e^{i\phi(t)}$. Thus, modulation of the interference fringes (another name of m) intervening in formula (1) is a quantity variant in time ($m(t)=m_0 e^{i\phi(t)}$).

The signal beam (14) and pump beam (3) interfering in the dynamic holographic material (4) then form a dynamic hologram which more or less easily follows the phase modulation generated by a vibration of the target (6). Moreover, the two beams diffract on the hologram that they form. In particular, the pump beam (3) diffracts on the hologram to produce a beam propagating in the direction of the transmitted signal beam (7).

The utilization condition of the velocimeter depends on the response time τ of the to dynamic holographic material. For example, for a sinusoidal vibration of amplitude δ and frequency f, the relation between τ and fδ is fixed by the condition:

$$f\delta < \frac{\lambda}{24\pi^2\tau} = \frac{4}{1000}\frac{\lambda}{\tau}$$

It is possible to detect vibrations of large amplitude and very low frequency as well as vibrations of high frequency and small amplitude. In contrast, it is not possible to measure vibrations of high frequency and large amplitude.

The device as shown in FIG. 1 is a two-wave mixing assembly in a photorefractive CdTe crystal. The crystal is used in anisotropic diffraction configuration within the outlet a quarter-wave plate (13) serving to create the phase shift $\phi_\gamma = \pi/2$, followed by a half-wave plate unit (17) and a polarization separator cube (18) simulating a polarization separator cube at 45°. A single path of the device is used with a single detector (8). In relation to the true anisotropic diffraction assembly, only the differential character of the outlet is not preserved. On the pump beam (3), a delay line is installed. It can be easily removed and replaced. When it is removed the pump beam (3) is transmitted onto a mirror (15) which sends back the beam onto a glass plate constituting the second separator plate of a Mach-Zehnder interferometer. (The first separator plate is the glass plate (2) that generates the pump beam (3) and the signal beam (14) of the two-wave mixing device.) It is thus possible to readily move from the two-wave mixing setup to a conventional interferometer which makes it possible to measure the phase shifting directly. At the outlet of the laser, a half-wave plate (11) and a polarizer (10) enable variation of the incidental power on the photorefractive crystal (4) and thus the time constant of the photorefractive effect. Taking into account the frequencies employed, one thereby advances from a (strong illumination) configuration in which the frequency is low in relation to the inverse of the response time of the photorefractive crystal to a (weak illumination) configuration in which the frequency is large in relation to the inverse of the response time of the photorefractive crystal. The operating domain in which we are interested is that of strong illumination, while the weak illumination domain corresponds to the two-wave mixing setup operating as ultrasound detector (8).

Figure 2:
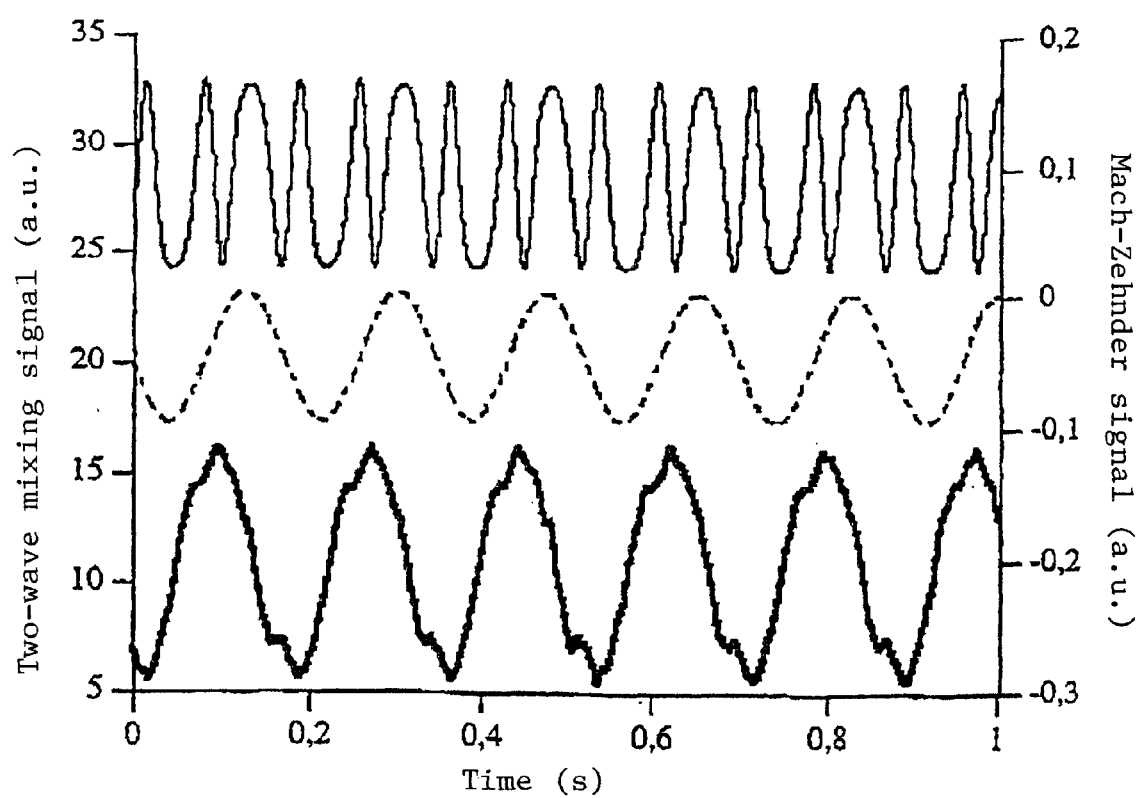
FIG. 2 is a graph comparing the response obtained with the two-wave mixing device (thick line) with that obtained with a Mach-Zehnder interferometer (fine line). The signal transmitted to the piezoelectric block in both cases is shown as a dashed line.

In the first measurement performed, one transmits a sinusoidal phase shifting of large amplitude (on the order of 2π) and low frequency compared to the inverse of the response time of the photorefractive crystal (short response time due to the strong incidental illumination). FIG. 2 shows the comparison of the response obtained with the two-wave mixing setup (thick line) with that obtained with a Mach-Zehnder interferometer (fine line). The signal transmitted to the piezoelectric block in both cases is shown as a dashed line.

The measurement is performed with the Mach-Zehnder interferometer (set almost in quadrature) and it is compared with the response provided by the two-wave mixing velocimeter. It can be seen that the phase shifting curve greater than π causes a complex response of the Mach-Zehnder, with multiple foldings of the response, corresponding to a phase shifting due to the piezoelectric mirror estimated at approximately $(3\pi/2)\sin(2\pi f\tau)$. In the case of the two-wave mixing velocimeter, the response is almost sinusoidal (one component of the second harmonic begins to be visible) and phase shifted by π/2 in relation to the initial phase shifting. Since this phase shifting of π/2 corresponds to a derivation of the sinus, we clearly have a response proportional to the instantaneous velocity of the target (6) as predicted by the theory and which in addition enables measurement of large displacements.

Figure 3:
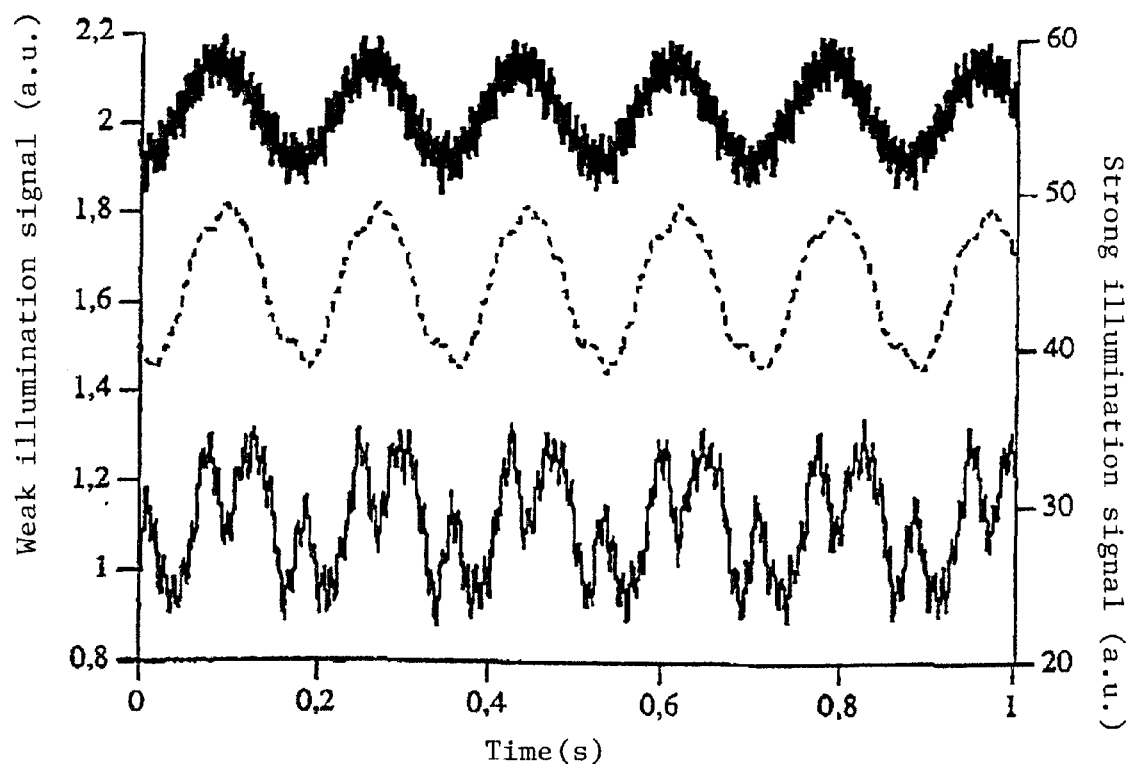
FIG. 3 is a graph of a signal of response to a sinusoidal phase modulation of large amplitude for a high illumination value (dashed line) and a weak illumination value (fine line). The thick line shows a measurement at weak illumination and with a phase shifting divided by 10.

FIG. 3 shows the signal of response to a sinusoidal phase modulation of large amplitude, for a strong value of illumination (dashed line) and a weak illumination (solid line). The thick line represents a measurement at weak illumination with a phase shifting divided by 10.

With the device shown in FIG. 1, one can also have an indication of the frequency response of the two-wave mixing velocimeter. The illumination is reduced such that the frequency of the phase modulation becomes large in relation to the inverse of the response time of the photorefractive crystal. The operation of the two-wave mixing no longer allows measurement of large phase shiftings. The vibration of the illumination figure on more than one fringe causes an obliteration of the grid which causes a drop in the efficacy of the measurement of the phase at the same time as the appearance of higher harmonics in the response, which can be seen in the fine line of FIG. 3. In order to again find a behavior that is linear with the phase shifting, it is necessary under these conditions to reduce the amplitude of the sinusoidal phase shifting. This can be seen in the thick line of FIG. 3 for which the amplitude of the phase shifting was reduced by a factor of 10.

Figure 4:
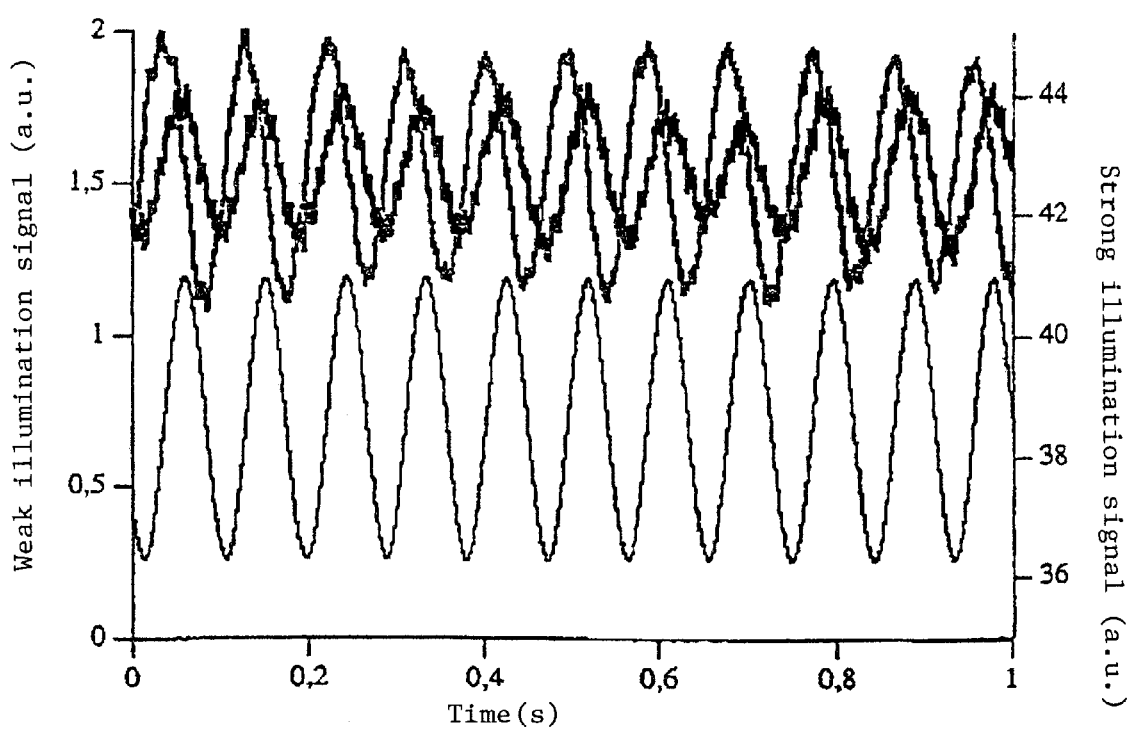
FIG. 4 is a graph of a response to a small sinusoidal phase shifting at weak illumination (thick line) and at strong illumination (shaded line). The signal transmitted to the piezoelectric block is shown as a fine line.

FIG. 4 shows the response to a sinusoidal phase shifting at weak illumination (thick line) and at strong illumination (shaded line). The fine line indicates the signal transmitted to the piezoelectric block.

The signal is then in phase with the phase shifting, contrary to the dashed curve obtained with large phase shifting and strong illumination power (low frequency domain). (In the figure the two curves are in phase for purely fortuitous reasons of change in the triggering level.) This point can be seen in greater detail in the next figure (FIG. 4). For this curve, one measures a small phase shifting (<π) and the incidental illumination is varied, with all other factors remaining constant, to move from the low frequency domain (strong illumination) to the high frequency domain (weak illumination). At low frequency, the two-wave mixing acts as a derivative which causes the phase shifting of π/2 between the response of the two-wave mixing (shaded line) in relation to the initial phase shifting (fine line). In contrast, at high frequency it is directly proportional (thick line) to the initial phase shifting, which translates the fact that the two curves are in phase.

Figure 5:
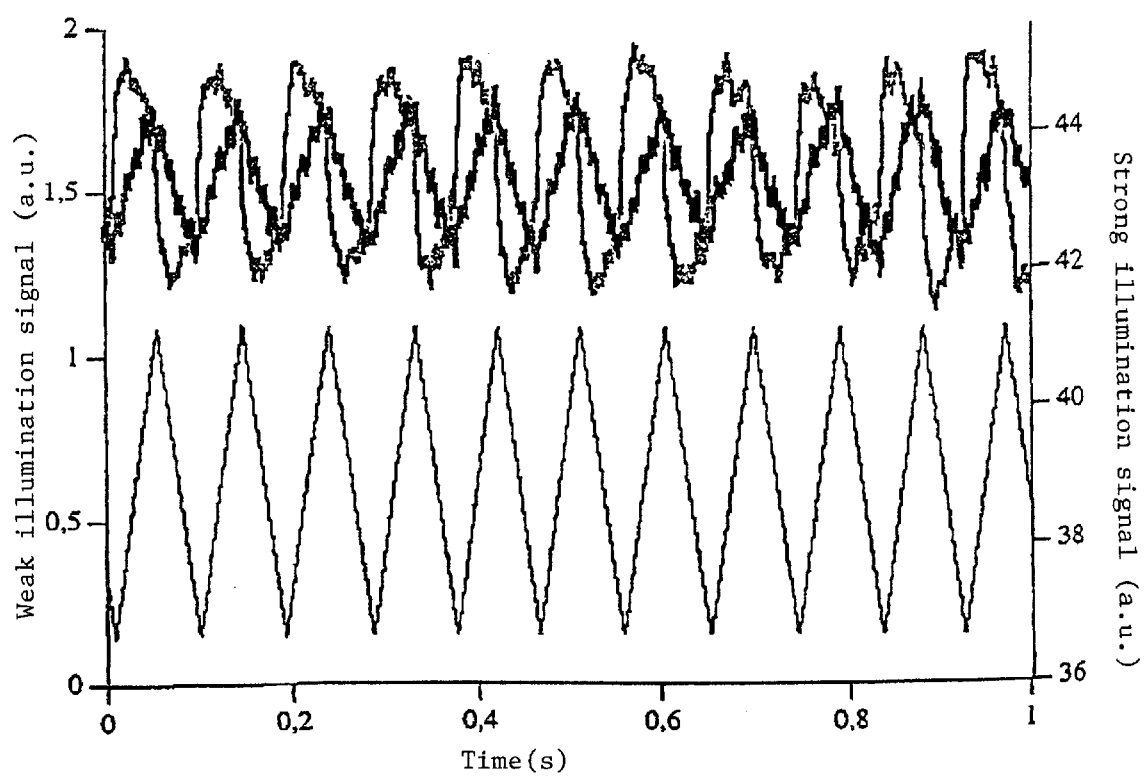
FIG. 5 is a graph of a response to a small triangular phase shifting at weak illumination (thick line) and at strong illumination (shaded line). The signal transmitted to the piezoelectric block is shown as a fine line.

FIG. 5 shows the response to a triangular phase shifting at weak illumination (thick line) and at strong illumination (shaded line). The fine line indicates the signal transmitted to the piezoelectric block. This derivative behavior is even more evident when a triangular signal of small amplitude is transmitted to the piezoelectric mirror (FIG. 5). At low frequency one measures the derivative of this signal (shaded line), which is a square signal, whereas at high frequency it is again proportional to the phase shifting as is shown by the triangular signal (shaded line) obtained on the detector (8).

Figure 6:
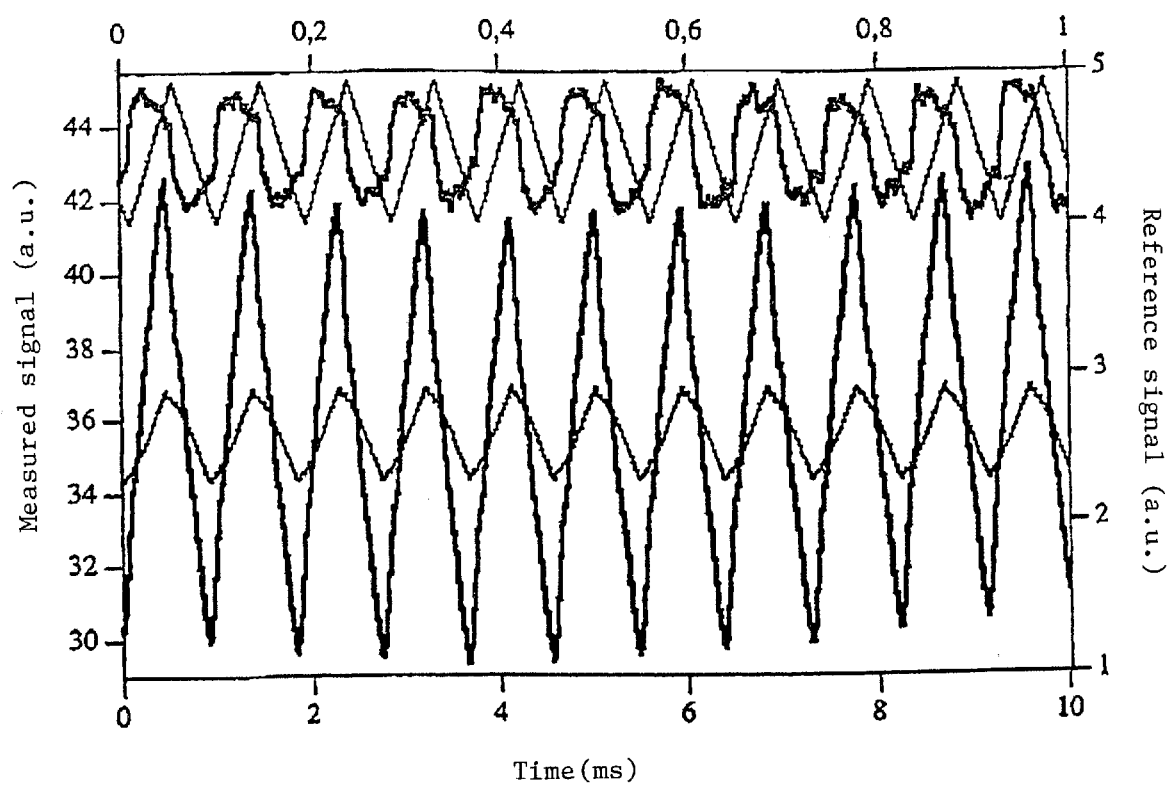
FIG. 6 is a graph of a response to a small triangular phase shifting at strong illumination (shaded line). Signals are obtained under the same conditions with a frequency multiplied by 100. The signal transmitted to the piezoelectric block is shown as a fine line.

Finally, in a final series of measurements as shown in FIG. 6, we retained a triangular phase shifting of small amplitude as well as a constant illumination, and we multiplied by 100 the frequency of the phase shifting, to pass directly from the low frequency domain to the high frequency domain. Here as well the measured signal passed from a square (shaded line) corresponding to a derivation of the low-frequency signal to a triangle corresponding to the response proportional to the phase shifting (thick line) obtained at high frequency (ultrasound pickup).

What is claimed is:

1. A process for velocimetric measurement of a target comprising:

causing interference in a dynamic holographic material of a reference laser beam and a beam diffused by the target to produce a signal beam having a luminous intensity that varies in relation to the instantaneous velocity of said target, all of said beams having a predetermined wavelength, measuring variations in said luminous intensity transmitted by the material with a photoelectric detector, wherein the target vibrates with a displacement greater than said wavelength and limited around a mean position, and determining said velocity based upon said luminous velocity.

2. The process according to claim 1, wherein detection is determined for vibration frequencies of the target lower than about 10 kHz.

3. The process according to claim 1, wherein detection is determined for vibration amplitudes of the target greater than about 0.1 μm.

4. The process according to claim 1, wherein an amplitude of displacement of the target is between $\lambda/10$ and $4\lambda/1000\pi F$ in which:

$\lambda$ designates the wavelength of the laser beam, $\tau$ designates the response time of the holographic material, F designates the vibration frequency.

5. A velocimeter comprising:

a laser which produces a beam;

a beam separator which divides the beam into a reference beam and a target beam;

a target vibrating at a frequency lower than about 10 kHz with an amplitude greater than about 0.1 μm around a mean position, said target diffusing said target beam;

a dynamic holographic material into which the reference and target beams are directed creating an interference pattern that produces a signal beam having a luminous intensity that varies in relation to the instantaneous velocity of said target, a photodetector which detects said variations in said luminous intensity of said signal beam produced by the dynamic holographic material, and an electronic processor for determining said velocity from said variations in said luminous intensity.

6. The velocimeter according to claim 5, wherein beam transport is performed with large core diameter multimodal fibers.

7. The velocimeter according to claim 5, wherein the dynamic holographic material is a material that produces a hologram and an illumination grid in which said hologram is in phase in relation to said illumination grid in a manner such that the phase difference, $\phi_Y$, is approximately equal to $\pi 2$.

8. The velocimeter according to claim 5, wherein the dynamic holographic material is a material that produces a hologram and an illumination grid in which said hologram is phase shifted by $\pi/2$ in relation to said illumination grid, and said velocimeter further comprises an external means for implementing a supplementary phase shifting to obtain a phase difference of $\phi_Y \approx \pi/2$.

9. The velocimeter according to claim 8, wherein the dynamic holographic material is a photorefractive material used in an anisotropic diffraction configuration.

10. The velocimeter according to claim 8, wherein a half-wave plate and a polarizer are positioned in the reference and target beams to polarize the reference beam along a direction X and to polarize the target beam at 45° to said direction X.

11. The velocimeter according to claim 9, wherein said signal beam comprises a transmitted signal beam and a diffracted beam, said beams having an X and a Y component, said external means for implementing a supplementary phase shift comprising a phase plate located downstream of the dynamic holographic material, wherein the phase plate shifts the phase of the Y component of the transmitted signal beam in relation to the diffracted beam which is polarized according to its X component, with the two components interfering in a polarization separator cube oriented 45° to the components X and Y, producing two beams that are directed onto two detectors.

12. The velocimeter according to claim 10, wherein said signal beam comprises a transmitted signal beam and a diffracted beam, said beams having an X and a Y component, said external means for implementing a supplementary phase shift comprising a phase plate located downstream of the dynamic holographic material, wherein the phase plate shifts the phase of the Y component of the transmitted signal beam in relation to the diffracted beam which is polarized according to its X component, with the two components interfering in a polarization separator cube oriented 45° to the components X and Y, producing two beams that are directed onto two detectors.

13. A process for velocimetric measurement of a target that is vibrating with a displacement limited around a mean position comprising the steps of:

causing interference in a dynamic holographic material of a reference laser beam and a beam diffused by said target to produce a signal beam having a luminous intensity that varies in relation to the instantaneous velocity of vibration of said target;

detecting said variations of said luminous intensity of said signal beam; and determining said velocity from said variations in luminous intensity.

14. The process according to claim 13, wherein said detection is determined for vibration frequencies of the target lower than 10 kHz.

15. The process according to claim 13, wherein said detection is determined for vibration amplitudes of the target greater than 0.1 μm.

16. The process according to claim 13, wherein said displacement of said target is between $\lambda/10$ and $4\lambda/1000\pi F$ in which:

$\lambda$ designates the wavelength of said reference laser beam, $\tau$ designates the response time of the holographic material, and F designates the vibration frequency.

17. A velocimeter comprising:

a laser producing a beam divided into a reference beam and a target beam diffused by a target vibrating at a frequency lower than 10 kHz with a displacement of greater than 0.1 μm around a mean position;

a dynamic holographic material in which said two beams interfere to produce a signal beam having a luminous intensity that varies in relation to the instantaneous velocity of said target;

a photodetector for detecting variations in said luminous intensity of said signal beam; and an electronic processor for determining velocity from said variations in luminous intensity.

18. The velocimeter according to claim 17, wherein at least one of said beams are transported with large core diameter multimodal fibers.

19. The velocimeter according to claim 17, wherein said dynamic holographic material comprises a photorefractive material with an applied electric voltage, and which produces a hologram and an illumination grid, wherein said hologram and said illumination grid have a phase difference, $\phi_\gamma$, of approximately $\pi/2$.

20. The velocimeter according to claim 17, wherein said dynamic holographic material comprises a photorefractive material without an applied electric voltage produces a hologram and an illumination grid, and said velocimeter further comprises an external means for implementing supplementary phase shifting, wherein said hologram and said illumination grid have a phase difference, $\phi_\gamma$, of approximately $\pi/2$.

21. The velocimeter according to claim 20, wherein said dynamic holographic material comprises a photorefractive material used in anisotropic diffraction configuration.

22. The velocimeter according to claim 20, wherein a half-wave plate and a polarizer are positioned in the reference and target beams to polarize said reference beam along a direction X and to polarize said target beam at 45° to the direction X.

23. The velocimeter according to claim 21, wherein said signal beam comprises a transmitted signal beam and a diffracted beam, said beams having an X and a Y component:

wherein said external means for implementing a supplementary phase shift comprises a phase plate located downstream of the dynamic holographic material, said phase plate shifting the phase of the Y component of the transmitted signal beam in relation to the diffracted beam which is polarized according to its X component; and wherein a polarization separator cube is oriented to 45° to said X and Y components wherein said transmitted signal beam and said diffracted beam interfere in said polarization cube and are each emitted by said polarization cube on to one of said two photodetectors.

24. The velocimeter according to claim 22, wherein said signal beam comprises a transmitted signal beam and diffracted beam, said beams having an X and a Y component:

wherein said external means for implementing a supplementary phase shift comprises a phase plate located downstream of the dynamic holographic material, said phase plate shifting the phase of the Y component of the transmitted signal beam in relation to the diffracted beam which is polarized according to its X component; and wherein a polarization separator cube is oriented at 45° to said X and Y components wherein said transmitted signal beam and said diffracted beam interfere in said polarization cube and are each emitted by said polarization cube on to one of said two photodetectors.

* * * * *